United States Patent
Kokubo

(10) Patent No.: US 8,287,012 B2
(45) Date of Patent: Oct. 16, 2012

(54) BUMPER REINFORCEMENT FOR VEHICLES

(75) Inventor: Sadao Kokubo, Oyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/936,210

(22) PCT Filed: Apr. 8, 2009

(86) PCT No.: PCT/JP2009/057165
§ 371 (c)(1),
(2), (4) Date: Nov. 18, 2010

(87) PCT Pub. No.: WO2009/125781
PCT Pub. Date: Oct. 15, 2009

(65) Prior Publication Data
US 2011/0049915 A1    Mar. 3, 2011

(30) Foreign Application Priority Data
Apr. 8, 2008  (JP) ................. 2008-099961

(51) Int. Cl.
*B60R 19/02*  (2006.01)
(52) U.S. Cl. ...................... 293/102; 293/122
(58) Field of Classification Search ............. 293/122, 293/146.6, 120, 102
See application file for complete search history.

(56) References Cited

U.S. PATENT DOCUMENTS

| | | | | |
|---|---|---|---|---|
| 3,735,463 A | * | 5/1973 | Merola | 29/897 |
| 5,093,990 A | * | 3/1992 | Klippel | 29/897.2 |
| 5,424,018 A | * | 6/1995 | Paul et al. | 264/176.1 |
| 5,997,058 A | * | 12/1999 | Pedersen | 293/102 |
| 6,349,521 B1 | * | 2/2002 | McKeon et al. | 293/102 |
| 6,517,142 B2 | * | 2/2003 | Gehringhoff et al. | 296/146.6 |
| 7,210,717 B1 | * | 5/2007 | Baccouche et al. | 293/102 |
| 2002/0033610 A1 | | 3/2002 | Mori et al. | |

FOREIGN PATENT DOCUMENTS

| | | |
|---|---|---|
| JP | 2001-062532 A | 3/2001 |
| JP | 2001-063495 A | 3/2001 |
| JP | 2001-322517 A | 11/2001 |
| JP | 2002-067842 A | 3/2002 |
| JP | 2003-127808 A | 5/2003 |
| KR | 2005045076 | * 5/2005 |

OTHER PUBLICATIONS

Official Communication issued in International Patent Application No. PCT/JP2009/057165, mailed on Jul. 14, 2009.

* cited by examiner

*Primary Examiner* — Dennis Pedder
(74) *Attorney, Agent, or Firm* — Keating & Bennett, LLP

(57) ABSTRACT

The present invention relates to a bumper reinforcement for vehicles having a fixing portion 11 to be fixed to a vehicle structural member at a part of the bumper reinforcement in a longitudinal direction. The bumper reinforcement is constituted by an integrally molded product obtained by deforming a hollow extruded product by plastic working. When the fixing portion 11 and vicinities thereof is defined as a reinforced portion 1, light-weighted portion 21s and 22 smaller in second moment of area and cross-sectional area than the reinforced portion 1 are provided at least part of a non-reinforced portion constituted by a portion other than the reinforced portion. This makes it possible to decrease the number of parts and trim the weight while securing strength.

10 Claims, 10 Drawing Sheets

BUMPER REINFORCEMENT FOR VEHICLES

TECHNICAL FIELD

The present invention relates to a bumper reinforcement for vehicles and its related technologies suitably used for, e.g., a front underrun protector for large-sized vehicles.

BACKGROUND ART

A vehicle bumper to be attached to a front end or a rear end of a vehicle is required to have a predetermined strength.

For example, in the vehicle bumper as shown in the following Patent Documents 1 and 2, the vehicle bumper is equipped with a main structural member made of, e.g., an extruded member, and reinforcing members are attached to the main structural member to increase the strength of required portions of the main structural member.

PRIOR ART DOCUMENTS

Patent Documents

Patent Document 1: Japanese Unexamined Laid-open Patent Application Publication No. 2001-322517 (Claims, FIGS. 1-6)

Patent Document 2: Japanese Unexamined Laid-open Patent Application Publication No. 2003-127808 (Claims, FIGS. 1-3)

SUMMARY OF THE INVENTION

Problems to be Solved by the Invention

However, the conventional vehicle bumper as shown in the aforementioned Patent Documents 1 and 2 is constituted by a plurality of members such as a main structural member and a plurality of reinforcement members, which causes a problem that the number of members are increased.

On the other hand, in constituting a vehicle bumper by a single member, for example, a product such as a single extruded member, if the entire bumper is reduced in thickness and diameter, a predetermined strength cannot be secured. To the contrary, if the entire bumper is increased in thickness and diameter, the weight increases though the strength can be secured.

The preferred embodiment of the present invention are made in view of the aforementioned problems and/or other problems in the related art. The preferred embodiments of the present invention can significantly improve upon existing methods and/or apparatuses.

The present invention was made in view of the aforementioned problems, and aims to provide a vehicle bumper reinforcement and its related technologies capable of reducing the number of components and weight while securing a sufficient strength.

The other objects and advantages of the present invention will be apparent from the following preferred embodiments.

Means for Solving the Problems

The present invention can be summarized to have the following structure to achieve the aforementioned object.

[1] A bumper reinforcement for vehicles, the bumper reinforcement having a fixing portion to be fixed to a vehicle structural member at a part of the bumper reinforcement in a longitudinal direction thereof, wherein the bumper reinforcement is an integrally molded product obtained by deforming a hollow extruded product by plastic working, and wherein, when the fixing portion and vicinities thereof is defined as a reinforced portion, a light-weighted portion smaller in second moment of area and cross-sectional area than the reinforced portion is formed at least a part of a non-reinforced portion constituted by a portion other than the reinforced portion.

[2] The bumper reinforcement for vehicles as recited in the aforementioned Item 1, wherein a die-less working for deforming a cross-sectional shape of the hollow extruded product by applying a tensile force or a compressive force to the hollow extruded product in the longitudinal direction is used as the plastic working.

[3] The bumper reinforcement for vehicles as recited in the aforementioned Items 1 or 2, wherein the light-weighted portion is formed to be thinner than the reinforced portion.

[4] The bumper reinforcement for vehicles as recited in any one of the aforementioned Items 1 to 3, wherein the light-weighted portion is formed to have an outer diameter smaller than the reinforced portion.

[5] The bumper reinforcement for vehicles as recited in any one of the aforementioned Items 1 to 4, wherein a light-weighted portion is formed in an intermediate portion in the longitudinal direction, and reinforced portions are formed on both sides of the light-weighted portion.

[6] The bumper reinforcement for vehicles as recited in the aforementioned Item 5, wherein the light-weighted portion formed at the intermediate portion includes shape transitional portions arranged on both sides in the longitudinal direction and connected to the reinforced portions on both sides, and a main light-weighted portion formed between the two shape transitional portions, and wherein the shape transitional portion is formed such that a cross-sectional shape changes smoothly from the reinforced portion to the main light-weighted portion.

[7] The bumper reinforcement for vehicles as recited in any one of the aforementioned Items 1 to 6, further comprising light-weighted portions on both side end portions in the longitudinal direction.

[8] A front underrun protector for large-sized vehicles, wherein the protector is constituted by the bumper reinforcement for vehicles as recited in any one of the aforementioned Items 1 to 7.

[9] A bumper main body for vehicles, wherein the bumper main body is constituted by the bumper reinforcement for vehicles as recited in any one of the aforementioned Items 1 to 7.

[10] A method of manufacturing a bumper reinforcement for vehicles, the bumper reinforcement having a fixing portion to be fixed to a vehicle structural member at a part of the bumper reinforcement in a longitudinal direction, the method comprising:

deforming a hollow extruded product by plastic working to manufacture the bumper reinforcement, wherein the bumper reinforcement is an integrally molded product obtained by deforming a hollow extruded product by plastic working, and wherein, when the fixing portion and vicinities thereof is defined as a reinforced portion, a light-weighted portion smaller in second moment of area and cross-sectional area than the reinforced portion is formed at least a part of a non-reinforced portion constituted by a portion other than the reinforced portion.

[11] A method of manufacturing a front underrun protector for large-sized vehicles, wherein the bumper reinforcement for vehicles manufactured by the manufacturing method as recited in the aforementioned Item 10 is finished into an underrun protection device for large-sized vehicles.

Effects Of The Invention

According to the bumper reinforcement for vehicles of the invention [1], the second moment of area of the reinforced portion that requires strength can be enhanced, which secures sufficient strength. Furthermore, because the light-weighted portion having a cross-sectional area smaller than the reinforced portion is formed, the bumper reinforcement can be reduced in weight. Also, since the bumper reinforcement is constituted by an integrally molded product, the number of components can be reduced.

According to the bumper reinforcement for vehicles of the invention [2] to [5], the aforementioned effects can be obtained more assuredly.

According to the bumper reinforcement for vehicle of the invention [6], the strength can be further improved.

According to the bumper reinforcement for vehicles of the invention [7], the weight can be further recued.

According to the front underrun protector for large-sized vehicles of the invention [8], the same effects as mentioned above can be obtained.

According to the bumper main body for vehicles of the invention [9], the same effects as mentioned above can be obtained.

According to the method of manufacturing a bumper reinforcement for vehicles of the invention [10], a bumper reinforcement for vehicles exerting the same effects as mentioned above can be manufactured.

According to the method of manufacturing a front underrun protector for large-sized vehicles of the invention [11], a front underrun protector for large-sized vehicles exerting the same effects as mentioned above can be manufactured.

BEST MODE FOR CARRYING OUT THE INVENTION

First Embodiment

Figure 1:
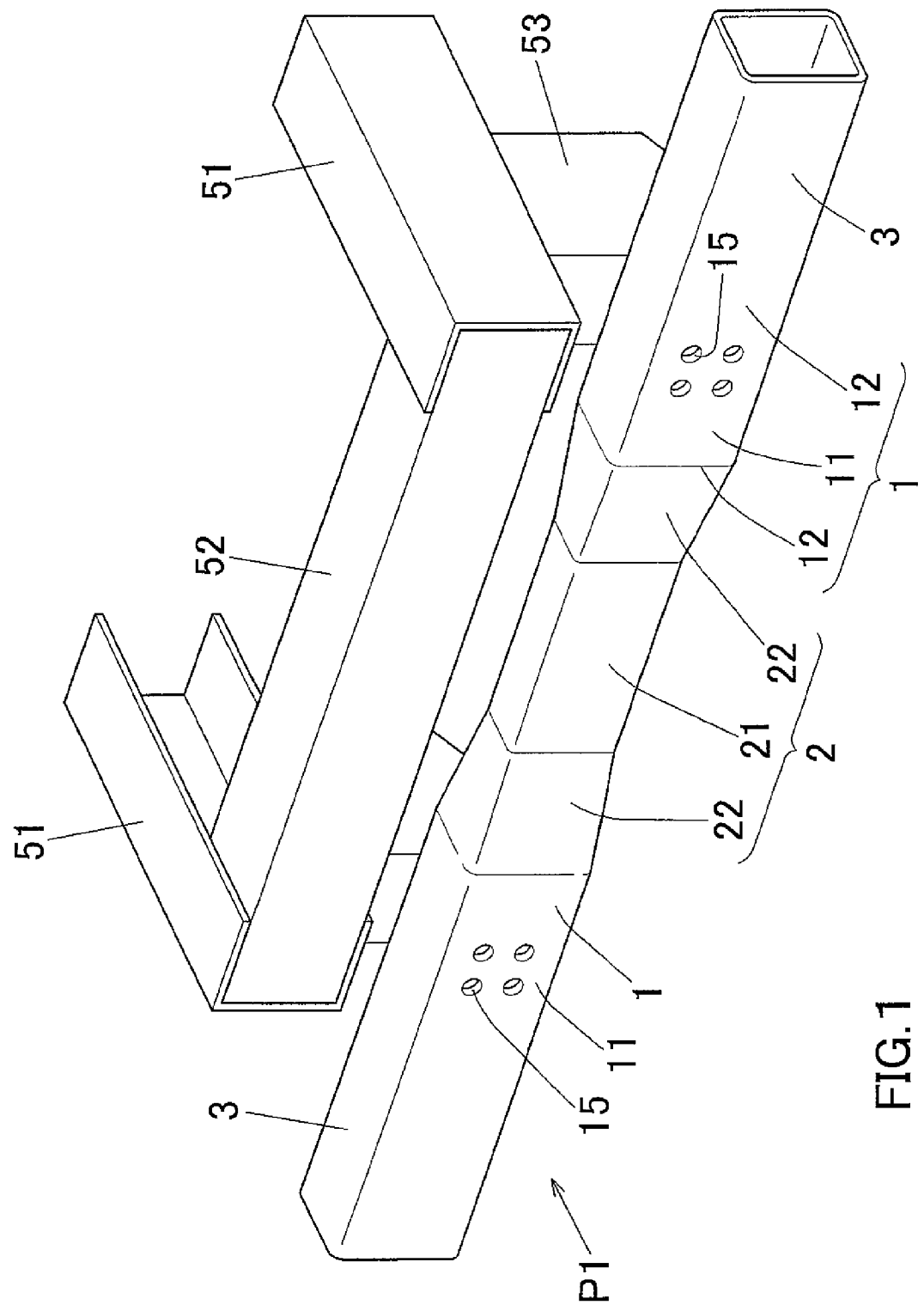
FIG. 1 is a perspective view showing a vehicle bumper reinforcement as a front underrun protector for large-sized trucks and the vicinity thereof according to a first embodiment of the present invention.
Figure 2:
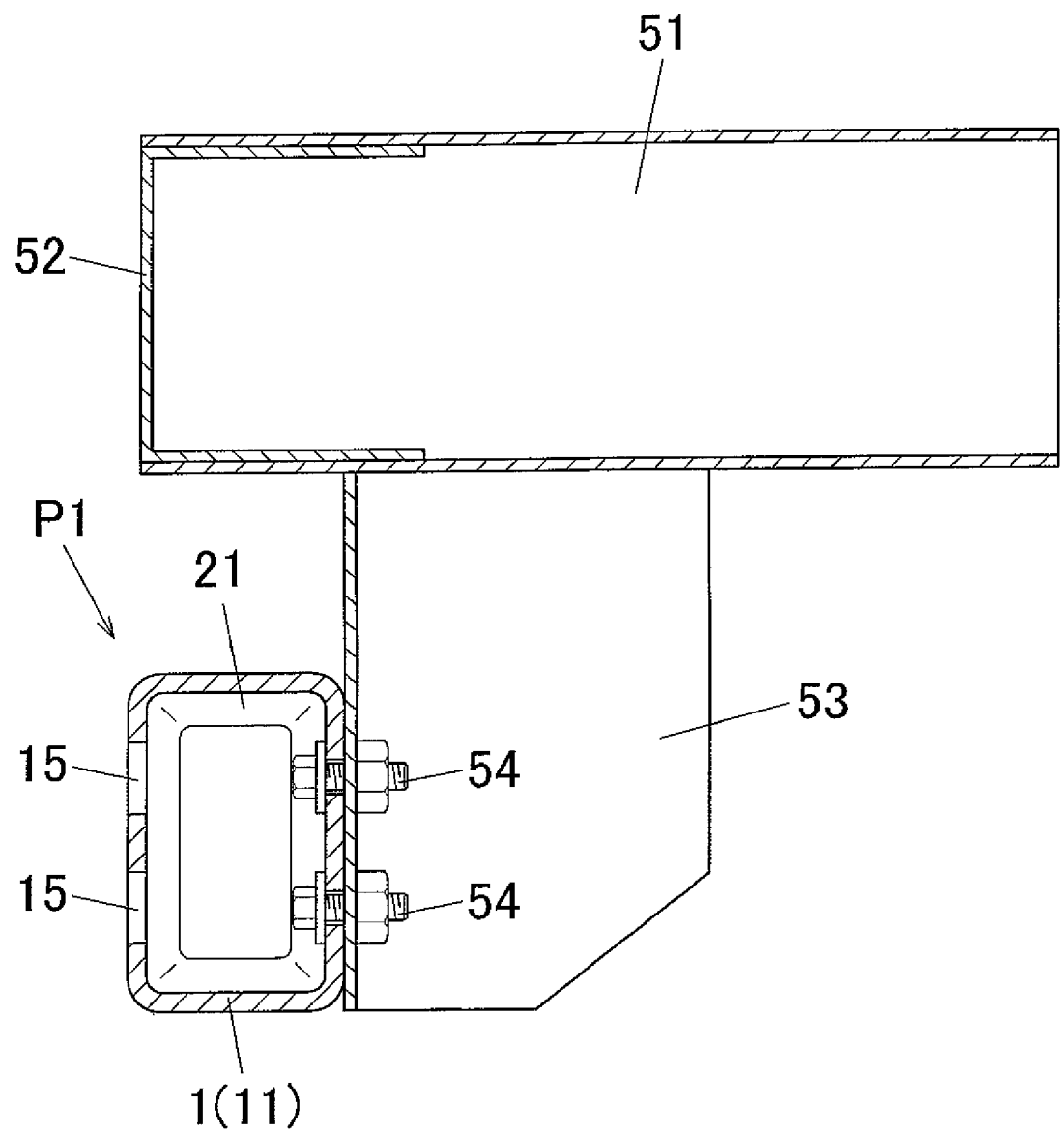
FIG. 2 is a side cross-sectional view showing the bumper reinforcement and the vicinity thereof according to the first embodiment.
Figure 3:
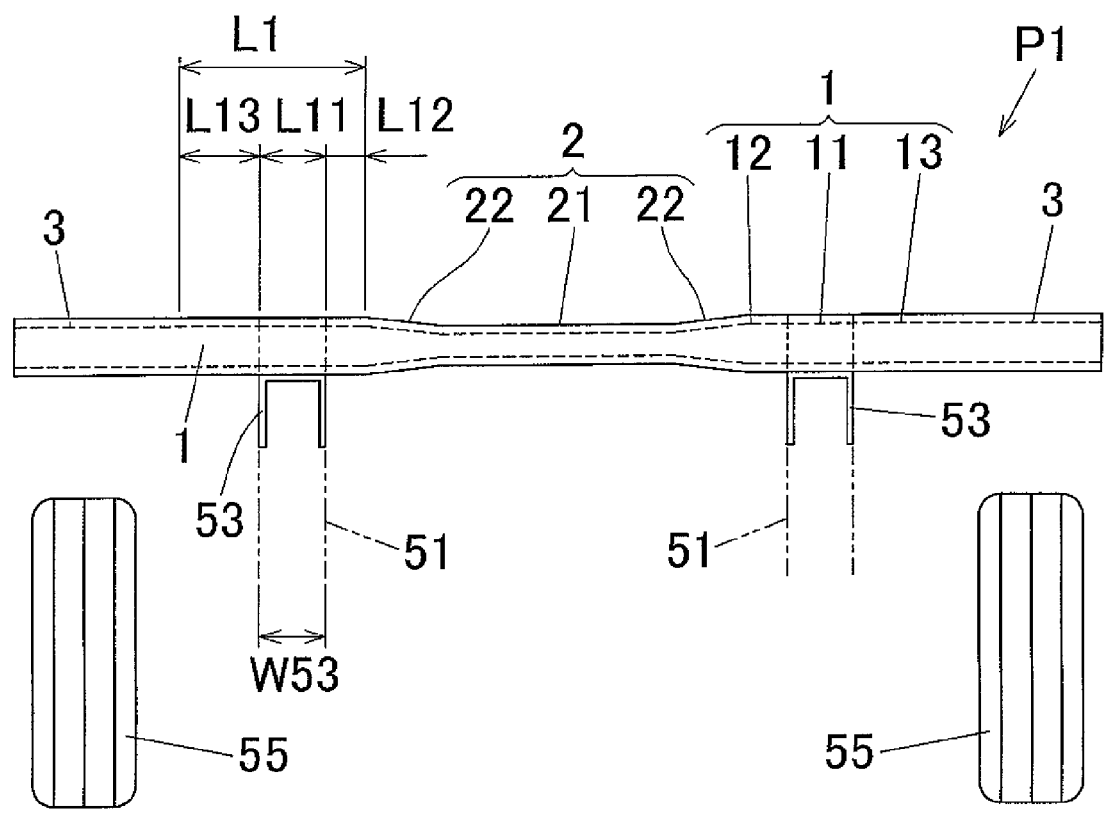
FIG. 3 is a top view showing the bumper reinforcement and the vicinity thereof according to the first embodiment.

FIG. 1 is a perspective view showing a bumper reinforcement and the vicinity thereof for use as a front underrun protector for large-sized trucks according to a first embodiment of the present invention, FIG. 2 is a side cross-sectional view thereof, and FIG. 3 is a top view thereof.

As shown in these figures, in a large-sized truck of this embodiment, a pair of right and left side frames 51 and 51, such as, e.g., main frames, which are arranged in parallel with each other and constitute vehicle structural members, are disposed so as to extend in a fore-and-aft direction of the vehicle.

A cross member 52 is arranged between the front ends of the pair of side frames 51 and 51 and secured thereto, and a pair of right and left stays 53 and 53 are provided so as to protrude downwards from the front end lower surfaces of the pair of side frames 51 and 51.

On the lower end front surfaces of the stays 53 and 53, a long bumper reinforcement P1 is attached as a front underrun protector (FUP).

In FIG. 3, the symbol "55" denotes a front wheel of the truck.

The bumper reinforcement P1 is made of aluminum or its alloy and constituted by an integrally molded hollow square pipe shaped product, and arranged with the longitudinal direction thereof extending in the vehicle widthwise direction.

In the bumper reinforcement P1, as will be explained later, the portions to be secured to the pair of stays 53 and constitute fixing portions 11 and 11, respectively. In this embodiment, the fixing portions 11 and 11 are provided at both sides of the intermediate portion of the bumper reinforcement P1.

The fixing portions 11 and 11 of the bumper reinforcement P1 and the vicinities thereof constitute reinforced portions 1 and 1 which will be detailed later.

In this embodiment, the fixing portions 11 and 11 are constituted by sections secured to the vehicle structural members, such as, e.g., the stays 53 and 53, and the length L11 of the fixing portion 11 corresponds to the width W53 of the stay 53.

A section (not including the reinforced portions) of the bumper reinforcement P1 of this embodiment located between both the reinforced portions 1 and 1 is defined as an intermediate portion 2, and sections (not including reinforced portion) located at outer sides of both the reinforced portions 1 and 1 are defined as both side portions 3 and 3.

In this embodiment, regions other than the reinforced portions 1 and 1 of the bumper reinforcement P1, or the intermediate portion 2 and both the side portions 3 and 3, constitute non-reinforced portions.

Now, the structure of the reinforced portion 1 of this embodiment will be detailed. The reinforce portion 1 is constituted by the fixing portion 11 and the vicinities thereof. In this embodiment, the length L1 of the reinforced portion 1 is set to 200 to 800 mm. The length L1 is set to 1.5 to 8 times the length L11 of the fixing portion 11.

In this embodiment, in both side regions of the reinforced portion 1 excluding the fixing portion 11, when one of the side regions located at the side of the intermediate portion 2 is defined as a reinforced portion inner end section 12 and the other side region is defined a reinforced portion outer end section 13, the length L12 of the reinforced portion inner end section 12 is set to 50 to 350 mm. Furthermore, the length L12 is set to 0.5 to 3.5 times the length of the fixing portion 11. The length L13 of the reinforced portion outer end section 13 is set to 50 to 350 mm. The length L13 is set to 0.5 to 3.5 times the length of the fixing portion 11, and 0.1 to 0.8 times the length of the side portion 3.

In this invention, in cases where the length L12 of the reinforced portion inner end section 12 is too short, as will be explained later, there is a possibility that it cannot obtain a sufficient impact resistance characteristic against the load F2 applied to the intermediate portion 2 at the time of a collision. Furthermore, in cases where the length L13 of the reinforced portion outer end section 13 is too short, there is a possibility that it cannot obtain a sufficient impact resistance characteristic against the load F3 applied to both the side portions 3 at the time of a collision. Furthermore, in cases where the length L12 of the reinforced portion inner end section 12 and/or the length L13 of the reinforced portion outer end section 13 is too long, there is a possibility that the weight (mass) increases.

In the present invention, the length L12 of the reinforced portion inner end section 12 and the length L13 of the reinforced portion outer end section 13 can be different with each other; in other words, it is not always required to match the vehicle widthwise middle position of the fixing portion 11 and the vehicle widthwise middle position of the reinforcing portion 1.

In this embodiment, the intermediate portion 2 of the bumper reinforcement P1 constitutes an intermediate light-weighted portion. Furthermore, the light-weighted portion as the intermediate portion 2 includes shape transitional portions 22 and 22 each connected to the corresponding reinforced portion 1 and a main light-weighted portion 21 provided between the two shape transitional portions 22 and 22.

The main light-weighted portion 21 is formed to have the same cross-sectional shape along the entire longitudinal direction, and the shape transitional portion 22 is formed in such a way that the cross-sectional shape changes along the longitudinal direction, which will be explained later.

In this embodiment, the bumper reinforcement P1 includes non-light-weighted portions constituted by the regions other than the light-weighted portions, or the main light-weighted portion and the shape transitional portions 22.

In the present invention, each of the reinforced portions 1 and 1 is constituted by the non-light-weighted portion, but the non-light-weighted portion does not always constitute the reinforced portion. For example, both the side portions 3 and 3 constitute non-light-weighted portions, but do not constitute the reinforced portions.

Figure 4:
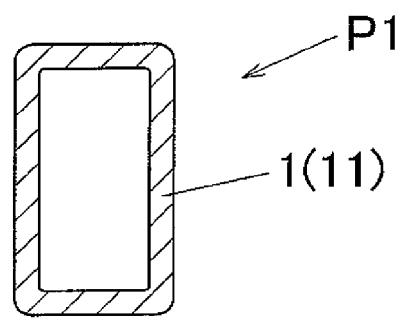
FIG. 4 is a side cross-sectional view of a reinforced portion of the bumper reinforcement of the first embodiment.
Figure 5:
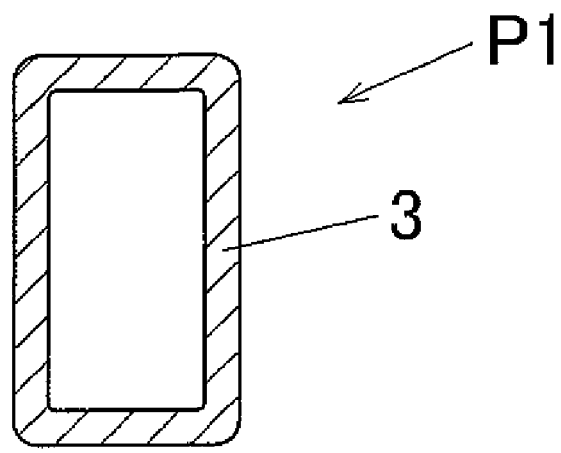
FIG. 5 is a side cross-sectional view of a side portion of the bumper reinforcement of the first embodiment.

In this embodiment, as shown in FIGS. 4 and 5, both of the reinforced portion 1 and both the side portions 3 constituting the non-light-weighted portions are the same in cross-sectional shape, and each formed into a vertically long rectangular a cross-sectional shape in which the up-and-down length (height) is longer than the fore-and-aft length. Furthermore, the reinforced portion 1 and both the side portions 3 constituting the non-light-weighted portions are formed to have the same cross-sectional shape at any position in the longitudinal direction thereof.

Figure 6:
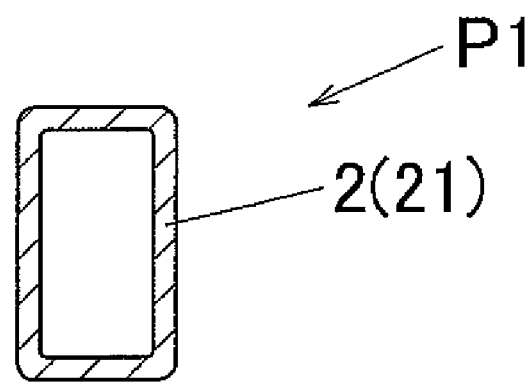
FIG. 6 is a side cross-sectional view of a main light-weighted portion of the bumper reinforcement of the first embodiment.

Also, as shown in FIG. 6, in the same manner as mentioned above, the main light-weighted portion 21 is also formed to have a vertically long rectangular cross-sectional shape in which the up-and-down length (height) is longer than the fore-and-aft length. The cross-sectional shape is set to be smaller than the cross-sectional shape of the abovementioned non-light-weighted portion 1 and 3 and to have an approximately similar shape, and the main light-weighted portion 21 is formed to have a peripheral wall thickness thinner than that of the non-light-weighted portion 1 and 3. Therefore, the main light-weighted portion 21 is formed to be smaller in second moment of area and cross-sectional area than the non-light-weighted portions 1 and 3. Furthermore, the main light-weighted portion 21 is formed to have the same cross-sectional shape at any position in the longitudinal direction.

On the other hand, the shape transitional portions 22 and 22 formed on both sides of the intermediate portion 2 are each formed to have a vertically long rectangular cross-sectional shape similar to the cross-sectional shape of the reinforced portion 1 and 1 and that of the main light-weighted portion 21. Furthermore, the cross-sectional shape of the shape transitional portion 22 and 22 continuously and smoothly changes such that the outer diameter and the wall thickness gradually decrease from the reinforced portion 1 and 1 to the main light-weighted portion 21. Thus, the second moment of area and the cross-sectional area of the shape transitional portion 22 continuously and smoothly changes.

The rear walls of both the fixing portions 11 and 11 of the bumper reinforcement P1 having the aforementioned structure are fixedly secured to the lower end portions of the pair of stays 53 and 53 of a large-sized truck via bolts 54, whereby the bumper reinforcement P1 is assembled to the front end lower portion of the large-sized truck along the vehicle widthwise direction.

The front wall of each of the fixing portions 11 and of the bumper reinforcement P1 is provided with working holes 15 and 15 for inserting or fastening bolts 54.

The bumper reinforcement P1 of this embodiment is manufactured by subjecting a square pipe-shaped work W to die-less working as plastic working.

Figure 7:
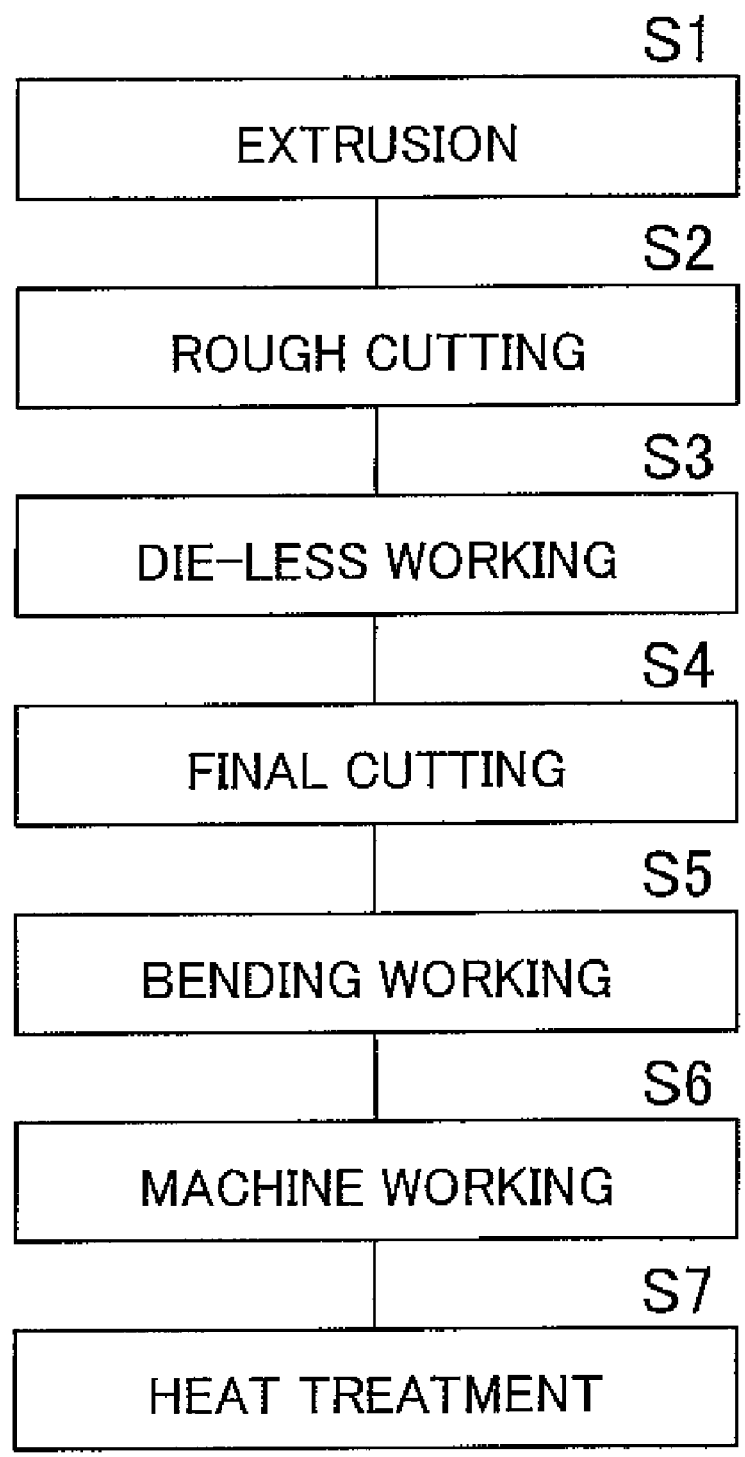
FIG. 7 is a flowchart explaining a manufacturing method of the bumper reinforcement of the first embodiment.

The work W to be subjected to the die-less working is obtained by extrusion. That is, as shown in FIG. 7, an extruded member of aluminum or its alloy is continuously extruded with a known extruder to obtain a hollow extruded member (Step 1).

Next, the extruded material is roughly cut to adjust a length appropriately, to thereby obtain a hollow extruded product as a work W (Step S2). The work W has a vertically long rectangular cross-section approximately similar to the cross-section of the bumper reinforcement P1 to be manufactured.

Figure 8:
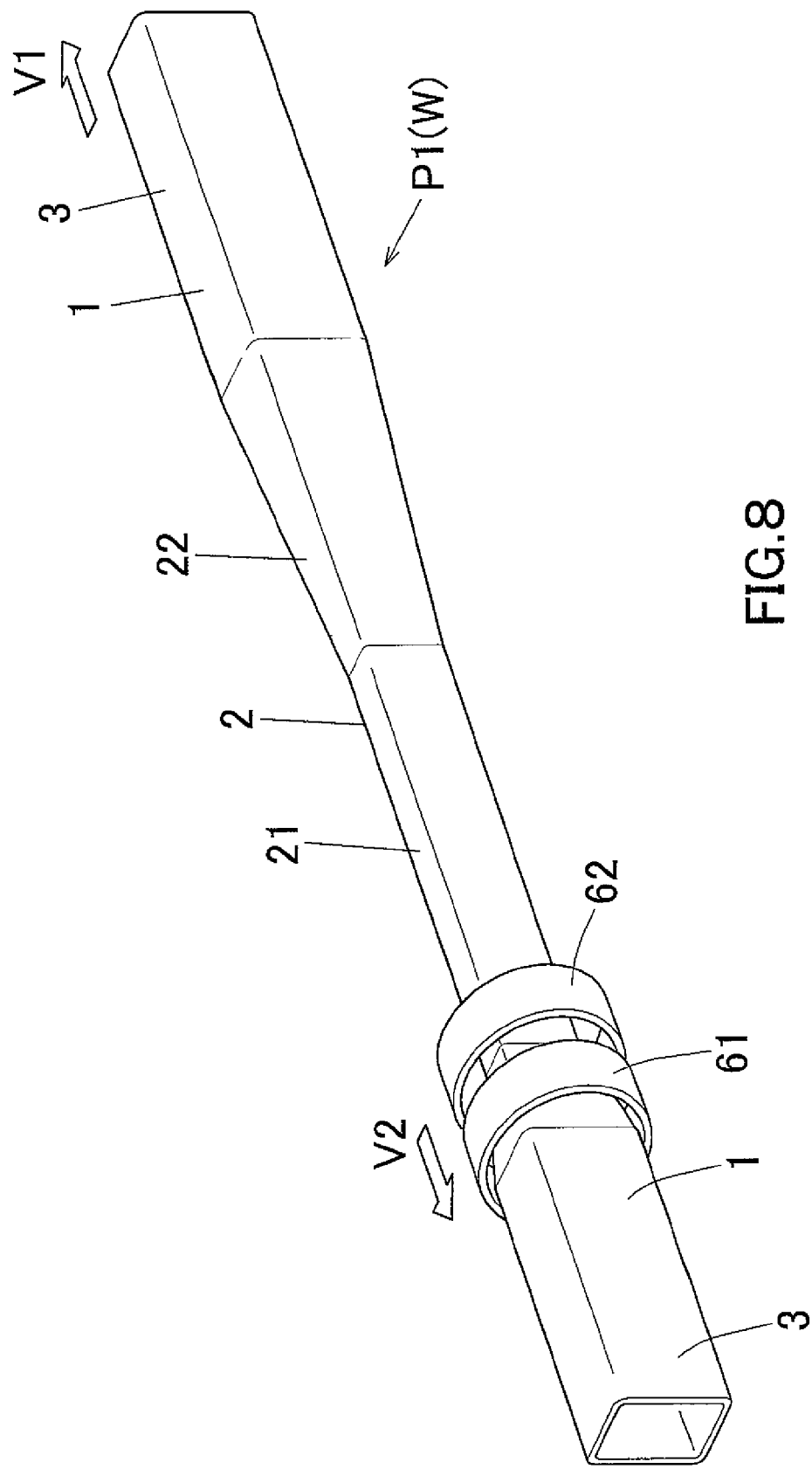
FIG. 8 is a perspective view showing a state in which the bumper reinforcement is being manufactured.

As shown in FIG. 8, the die-less working device for performing a die-less working on the work W is configured to work on the work W while transferring the work W along the longitudinal direction (axial direction) thereof. Provided that the transferring direction of the work W (upper right direction in FIG. 8) is defined as a front side direction (downstream side direction), a pulling device (not illustrated in figures) for pulling the work W forward with the front end gripped is provided. The die-less working device includes a heating coil 61 for heating the work W and a cooling coil 62 for cooling the work W, which are configured to be moved in the transferring direction of the work W in a synchronized manner.

In this embodiment, the heating coil 61 is moved rearward (toward the upstream side) while heating the work W with the heating coil 61, and the work W is pulled forward (toward the downstream side) by the pulling device. By applying tensile force to the heated portion of the work W as described above, the heated portion of the work W is reduced in diameter and thickness to be deformed. Furthermore, the shape deformed portion is cooled by the cooling coil 62 that travels together with the heating coil 61 to be solidified (frozen) and stabilized (Step S3 of FIG. 7).

Specifically, in the work W, at the portions corresponding to the non-light-weighted portions such as the downstream side portion 3 and the reinforced portion 1 of the bumper reinforcement P1, the heating coil 61 and the cooling coil 62 are moved rearward at a constant speed while the work W is hardly pulled by the pulling device. That is, the pulling speed V1 of the work W is set to approximately 0 (zero) while maintaining the travelling speed V2 of the coils 61 and 62 constant. Consequently, almost no tensile force (deformation force) is applied to the heated portion of the work W to thereby almost maintain the original cross-sectional shape.

In the present invention, when processing the portions corresponding to the non-light-weighted portions such as the side portion 3 on the downstream side and the reinforced portion 1, the work W can be somewhat pulled or compressed with a pulling device to apply some tension and compression force to stretch the portion to reduce the diameter and thickness or to compress the portion to increase the diameter and thickness.

Next, in the work W, at the portions corresponding to the downstream side shape transitional portion 22 of the bumper reinforcement P1, while pulling the work W forward with the pulling device in a state in which the travelling speed V2 of the coils 61 and 62 are maintained constant, the pulling speed V1 is gradually increased. In this way, by gradually increasing the tensile force to the heated portion of the work W to gradually increase the stretching amount of the portion, the diameter and the thickness of the portion are reduced. Consequently, the portion corresponding to the shape transitional portion 22 on the downstream side is formed into a tapered shape in which the outer diameter and the thickness gradually decrease from the downstream side to the upstream side.

In this embodiment, regarding the pulling speed V1 by the pulling device, the initial speed for forming the shape transitional portion 22 on the downstream side is set to the same as the speed at which the portion corresponding to the side portion 3 on the downstream side and the reinforced portion 1 was formed.

Next, at the portion corresponding to the main light-weighted portion 21 of the intermediate portion 2 of the bumper reinforcement P1, the work W is pulled at a constant speed by setting the pulling speed V1 by the pulling device at a high speed in a state in which the travelling speed V2 of the coils 61 and 62 is maintained constant. Thus, strong tension is applied to the heated portion of the work W to stretch the portion to thereby decrease the diameter and the thickness. As a result, the portion corresponding to the main light-weighted portion 21 is formed into an elongated angular pipe shape equal in outer diameter and thickness along the entire longitudinal directional area. Therefore, the main light-weighted portion 21 becomes smaller in diameter, thickness, second moment of area, and cross-sectional area than those of the reinforced portion 1 and the side portion 3.

In this embodiment, the pulling speed V1 of the pulling device for forming the main light-weighted portion 21 is set to be the same as the final speed at which the shape transitional portion 22 on the downstream side was formed.

Next, at the portion of the work K corresponding to the shape transitional portion 22 on the upstream side of the bumper reinforcement P1, the pulling speed V1 for pulling the work W with the pulling device is gradually reduced in a state in which the travelling speed V2 of the coils 61 and 62 is maintained constant. In this way, the tension to the heated portion of the work W is gradually reduced to gradually reduce the diameter and thickness of the portion so that the amount of stretch to the portion is gradually reduced. Consequently, the portion of the work K corresponding to the shape transitional portion 22 on the upstream side is formed into a tapered shape in which the diameter and the thickness gradually increase from the downstream side to the upstream side.

In this embodiment, regarding the pulling speed V1 by the pulling device, the initial speed for forming the shape transitional portion 22 on the downstream side is set to be the same as the speed at which the portion corresponding to the main light-weighted portion 21 was formed.

Next, at the portion of the work K corresponding to the reinforced portion 1 and the side portion 2 on the upstream side of the bumper reinforcement P1, the pulling speed V1 of the pulling device is set to approximately 0 (zero) with the coil traveling speed V2 maintained constant. Consequently, no tensile force (deformation force) is applied to the heated portion of the work W to maintain the cross-sectional shape of the work W.

Needless to say, some tensile force or compressive force can be applied to the portion corresponding to the reinforced portion 1 and the side portion 2 on the upstream side to reduce the diameter and thickness by pulling the portion or to increase the diameter and thickness by compressing the portion.

In this embodiment, regarding the pulling speed V1 by the pulling device, the speed for forming the reinforced portion 1 and the side portion 3 on the upstream side is set to be the same as the final speed at which the shape transitional portion 22 on the upstream side was formed.

This embodiment employs a die-less working device configured to move the heating coil 61 and the cooling coil 62 toward the upstream side along the work transferring direction. The present invention, however, is not limited to the above. In the present invention, it can be configured such that the heating coil 61 and the cooling coil 62 are moved relative to the work by feeding the basal end side (upstream side end portion) of the work toward the downstream side with the heating coil and the cooling coil fixed, or such that the basal end side of the work is fed while moving the heating coil and the cooling coil.

In this way, after subjecting the work to the die-less working (primary working) to produce a die-less worked product having a narrow intermediate portion 2, the die-less worked product is cut into a predetermined size (Step S4 in FIG. 7).

The obtained interim product is subjected to a bending press work (secondary working) as needed (Step S5). In this embodiment, since a straight member is employed as a bumper reinforcement P1, no bending press work (Step S5) is performed. Such a bending press work is performed in the second embodiment which will be explained later.

Subsequently, mechanical working (Step 6) is performed to form bolt-holes or working-holes in the interim product, thereafter heat treatment such as annealing is performed (Step S7) to thereby obtain a bumper reinforcement P1 of this embodiment.

In the obtained bumper reinforcement P1, the main light-weight portion 21 of the intermediate portion 2 is formed to be smaller in outer diameter and thinner in wall thickness than the reinforced portion 1 and both side portions 3, and each of the shape transitional portions 22 and 22 is formed into a tapered shape which smoothly and continuously changes from the cross-sectional shape of the reinforced portion 1 to that of the main light-weighted portion 21.

According to the first embodiment structured as mentioned above, since the portions including the reinforced portion 1, the intermediate portion 2, and the side portion 3 are integrally connected with each other, sufficient connection strength between the portions 1 to 3 can be secured, which in turn can secure sufficient entire strength. This results in a bumper product such as a bumper reinforcement P1 excellent in shock resistance and high in reliability.

Furthermore, the bumper reinforcement P1 according to this first embodiment is constituted by an integrally molded product obtained by subjecting a hollow work W to die-less working, and therefore the number of structural parts essentially becomes one. This reduces the number of parts, requires no connection between parts, enables easy production, and reduces the production cost.

In the present invention, another members such as fixtures can be attached to the bumper reinforcement P1 obtained through the die-less working to obtain a final product. As the fixtures to be attached to the bumper reinforcement P1, a boarding step which constitutes a step for boarding a vehicle can be exemplified.

In the first embodiment, since the intermediate portion 2 as a light-weighted portion is formed to be smaller in diameter, thinner in wall thickness, and smaller in cross-sectional area as compared with the non-light-weighted portions 1 and 3, the weight can be reduced, which in turn can trim the entire weight.

Furthermore, the bumper reinforcement P1 of this second embodiment is formed into a hollow pipe shape, which further can trim the weight.

Furthermore, in the bumper reinforcement P1 of this first embodiment, the shape transitional portion 22 is formed between the large cross-sectional reinforced portion 1 and the small cross-sectional main light-weighted portion 21, and the shape transitional portion 22 is formed such that the cross-sectional shape smoothly and continuously changes from the reinforced portion 1 to the main light-weighted portion 21, resulting in no portion where the cross-sectional shape changes suddenly, or no portion on which stress due to, e.g., a collision load, concentrates. Therefore, it becomes possible to effectively prevent local concentration of the impact force applied to the bumper reinforcement P1, resulting in smooth distribution of the impact force, which improves the impact resistance characteristic, such as, e.g., strength and stiffness, more assuredly.

Furthermore, in the bumper reinforcement P1 of this first embodiment, die-less working is employed as the primary working (plastic working), eliminating the need of a molding die, which reduces the cost. This enables more efficient working, resulting in improved productivity.

Furthermore, the bumper reinforcement P1 of this first embodiment is produced by subjecting the extruded product as a work W to die-less working (tensile working), enabling easy production of a longer one, which improves the versatility.

Figure 9:
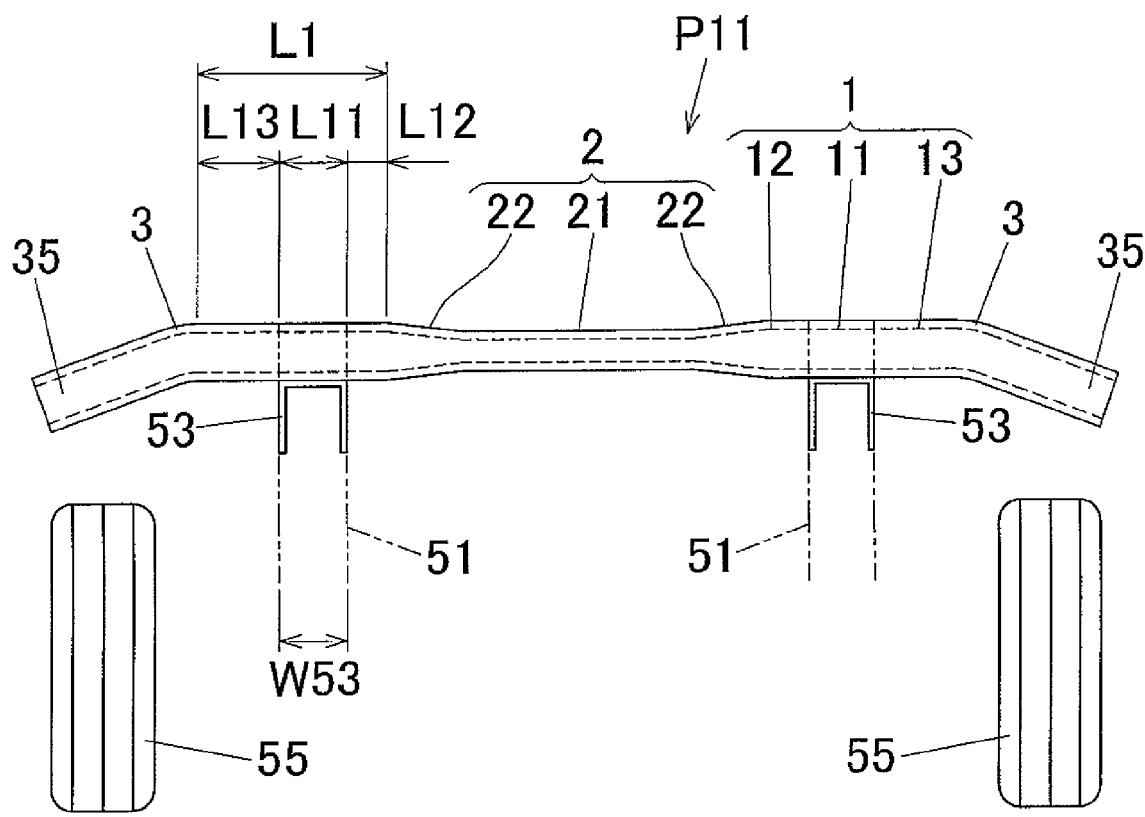
FIG. 9 is a top view showing a bumper reinforcement of a first modification of the present invention.

The bumper reinforcement P1 of this embodiment is formed into a straight shape extending straight from one end thereof to the other end thereof. The present invention, however, is not limited to the above. In the present invention, like the bumper reinforcement P11 shown in FIG. 9, the outer sides of both the side portions 3 and 3 can be bent rearward to form bent portions 35 and 35. The formation of the bent portions 35 and 35 can be performed by bending press working (secondary working) shown in Step S5 in FIG. 7.

The bumper reinforcement P11 having both side bend portions 35 and 35 exerts the same functions and effects as mentioned above.

In this embodiment, although the bumper reinforcements P1 and P11 are small in second moment of area of the intermediate portion 2 as the light-weighted portion. However, the bumper reinforcements P1 and P11 have sufficient strength as a bumper product as mentioned below.

Figure 12:
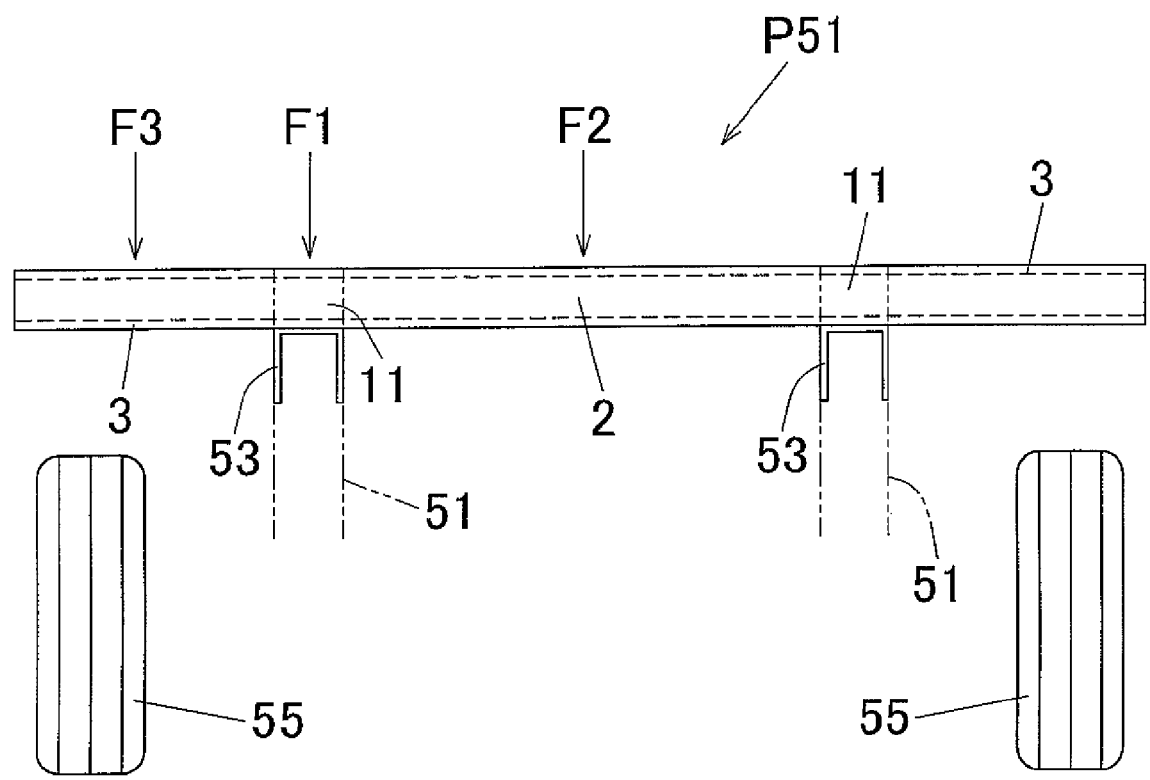
FIG. 12 is a top view showing a bumper reinforcement of a reference embodiment 1 which deviates from the gist of the present invention.

In a bumper reinforcement P51 having a cross-sectional shape constant along the entire longitudinal length as shown in FIG. 12, the case in which a load by pole pressing (offset collision) is applied to the fixing portion 1, the intermediate portion 2, and the side portion 3 will be considered below.

In this case, in the fixing portion 1, the rear surface is attached to a vehicle structure, such as, e.g., a stay 53, and therefore the load F1 applied to the fixing portion 11 at the time of a collision will be absorbed by crush deformation (collapse) of the fixing portion 11.

The intermediate portion 2 is supported at both end portions thereof by a vehicle structure, such as, e.g., stays 53, via the fixing portions 11 and 11, and in a both end supported state having fixing portions as fixed points. Therefore, the load F2 applied to the intermediate portion at the time of a collision will be absorbed by the bending deformation (crush deformation) of the vicinities of the fixing portions 11 and 11.

The side portion 3 is supported at the one side (inner side) thereof by a vehicle structure, such as, e.g., a stay 53, and in a cantilever state having one end as a fixed point. Therefore, the load F3 applied to the side portion 3 at the time of a collision will be absorbed by the bending deformation (crush deformation) of the vicinities of the fixed portion 11.

Among these portions 1 to 3, from the view point of the load bearing characteristics such as strength or stiffness, the most unfavorable portion is the side portions 3 and 3 in a cantilever state, the secondary unfavorable portion is the intermediate portion 2 in a both supported state, and the third unfavorable portion, or the most favorable portion, is the fixing portion 11. Therefore, in the technical field of a vehicle bumper, a vehicle bumper is usually designed and developed considering the stiffness and strength of the load F3 as a standard.

In the case of a bumper reinforcement P51 shown in FIG. 12 having a constant cross-section, it is required to form the fixing portion 11 and the vicinity thereof to have a thick wall thickness and a large diameter so as to cope with bending deformation of the fixing portion 11 and the vicinities thereof when an impact force F3 is applied to both side portions 3 and 3. In accordance with the thick and large diameter fixing portions 11 and 11, the intermediate portion 2 and both side portions 3 and 3 are also formed to have a thick wall thickness and a large diameter. In other words, the intermediate portion 2 and both side portions 3 and 3 are formed to have a thick wall thickness and a large diameter despite that they have stiffness and strength more than necessary.

Figure 13:
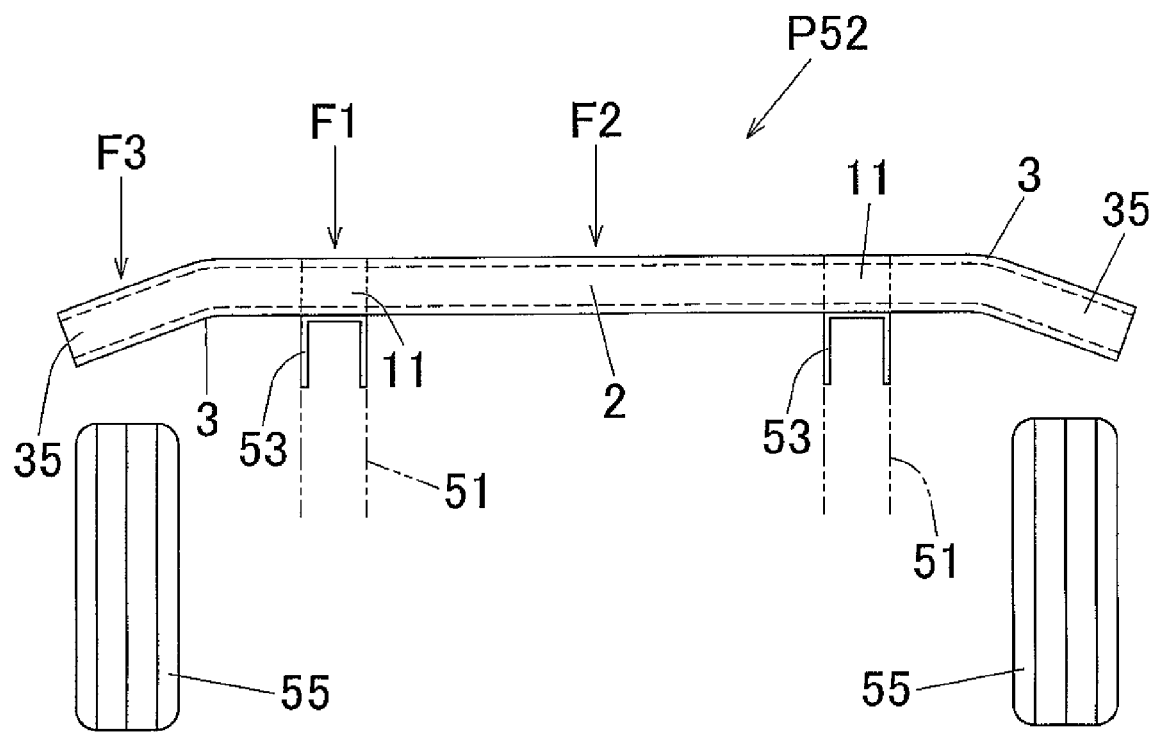
FIG. 13 is a top view showing a bumper reinforcement of a reference embodiment 2 which deviates from the gist of the present invention.

The above explanation was made by exemplifying the bumper reinforcement P51 extending straight from one end thereof to the other end thereof. However, as shown in FIG. 13, also in the bumper reinforcement P52 having bent portions 35 and 35 on the outer sides of the side portions 3 and 3, in cases of a bumper reinforcement having the same cross-sectional shape (outer diameter) along the entire length thereof, the intermediate portion 2 and both side portions 3 and 3 are formed to have a thick wall thickness and a large diameter in accordance with the fixing portions 11 and 11 having a thick wall thickness and a large diameter.

On the other hand, in the present embodiment, as shown in FIGS. 1 to 3, the intermediate portion 2 of the bumper reinforcement P1 is formed into a light-weighted portion 2 small in cross-section, but the fixing portions 11 and the vicinities thereof are formed such that the second moment of area of each of the reinforced portions 1 and 1 to which loads F1 to F3 concentrate at the time of a collision becomes large. This secures sufficient load bearing characteristic against any loads F1 to F3. Thus, sufficient load bearing characteristic at the time of a collision can be secured in the entire area of the bumper reinforcement P1. Furthermore, the bumper reinforcement P1 of this embodiment can also attain the weight saving since the intermediate portion 2 is constituted as a light-weighted portion small in cross-section.

The above explanation was made by exemplifying the bumper reinforcement P1 extending straight from one end to the other end. But, even in the case of the bumper reinforcement P11 which is a modified embodiment shown in FIG. 9 in which bent portions 35 and 35 are provided at both side portions 3 and 3, in the same manner as mentioned above, weight saving can be attained while securing sufficient load bearing characteristic at the time of a collision.

Second Embodiment

Figure 10:
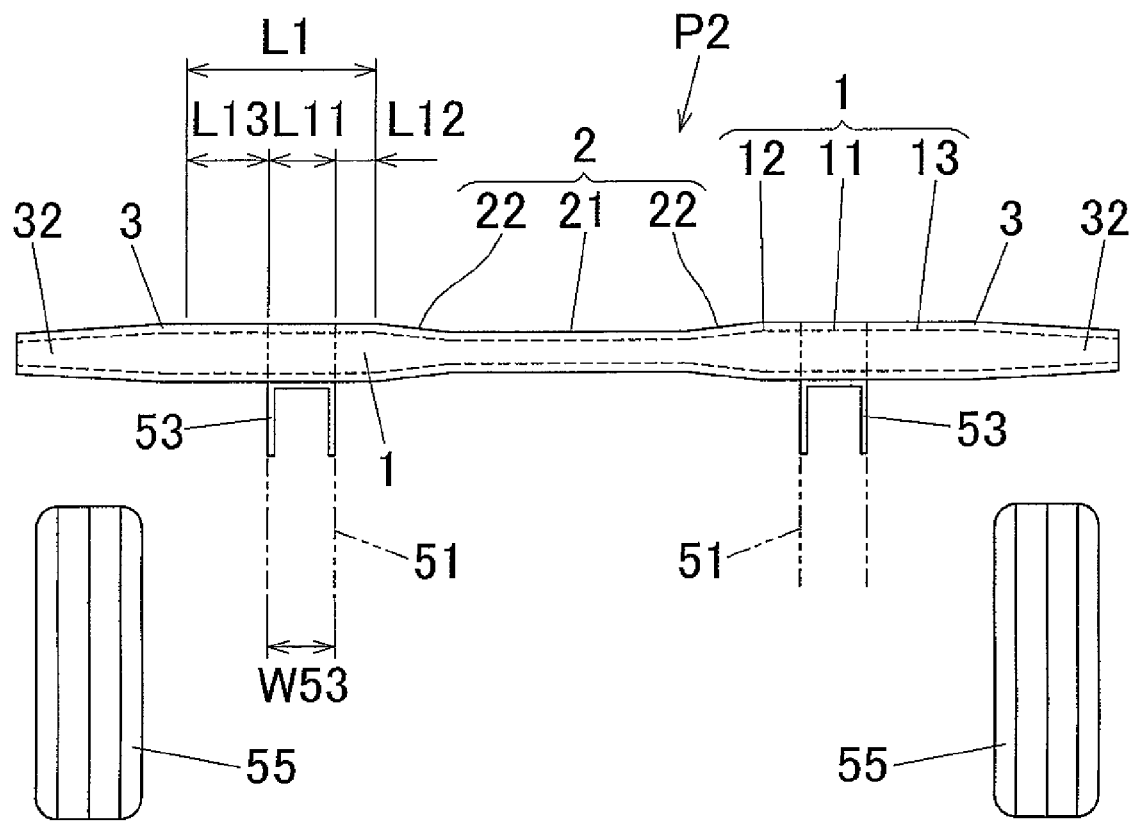
FIG. 10 is a top view showing a bumper reinforcement according to a second embodiment of the present invention.

FIG. 10 is a top view showing a front under lamp protector and the vicinity thereof for large-sized trucks according to a second embodiment of the present invention. As shown in this figure, in this bumper reinforcement P2 constituting the front under lamp proctor, in the same manner as in the first embodiment, the fixing portions and the vicinities thereof are constituted as reinforced portions 1 and 1, and the portion between the reinforced portions 1 and 1 is constituted as an intermediate portion 2 forming a light-weighted portion. Furthermore, the outer side portions of both the side portions 3 and 3 provided at outer sides of the fixing portions 11 and 11 are constituted as shape transition portions 32 and 32 forming light-weighted portions.

The shape transition portions 32 and 32 are each formed into a vertically long rectangular shape (rectangle shape). The shape transition portion 32 and 32 smoothly and continuously changes in cross-sectional shape such that the outer diameter and the wall thickness decrease as the shape transition portion extends outward, whereby the second moment of area and the cross-sectional area smoothly and continuously change.

In this second embodiment, the other structures are essentially the same as those of the first embodiment, and therefore the cumulative explanation will be omitted by allotting the same symbol to the same or corresponding portion.

Also in the bumper reinforcement P2 of this second embodiment, the same functions and effects as mentioned above are exerted.

Furthermore, in this second embodiment, since the outer side portions of both the side portions 3 and 3 are formed into shape transition portions 32 and 32 continuously reduced in diameter and wall thickness, further weight saving can be attained by the shape transition portions 32 and 32.

Even if a collision load (corresponding to F3 in FIGS. 12 and 13) is applied to the side portions 3 and 3, since the second moment of area of the fixing portion 11 and the vicinity thereof (reinforced portion) in the side portion 3 is large, load bearing characteristic against the load F3 can be secured, resulting in sufficient strength and rigidity.

In the bumper reinforcement P2 of this second embodiment, in producing the bumper reinforcement P2 by die-less working with the one side positioned at the tip end side (downstream side), at the portion corresponding to the shape transition portion 32 of the one side portion on the downstream side, the pulling speed V1 is gradually reduced while pulling the work toward the downstream side with a pulling device. By gradually reducing the tensile force to the heated portion of the work, the extension amount of the portion is gradually reduced to increase the diameter and the wall thickness. With this, the portion corresponding to the shape transition portion 32 of the one side portion 3 is formed into a tapered shape so that the outer diameter and the wall thickness gradually increase from the downstream side to the upstream side.

At the portion corresponding to the shape transition portion 32 of the other side portion 3 on the upstream side (basal end side), the pulling speed V1 is gradually increased while pulling the work toward the downstream side with a pulling device. By gradually increasing the tensile force to the heated portion of the work, the tension amount of the portion is gradually increased to thereby reduce the diameter and the wall thickness. With this, the portion corresponding to the shape transition portion 32 of the other side portion 3 is formed into a tapered shape so that the outer diameter and the wall thickness gradually decrease from the downstream side to the upstream side.

Modified Embodiment

In the aforementioned embodiment, the explanation was made by exemplifying the bumper reinforcement having a vertically long rectangular shape in cross-section. However, the cross-sectional shape of the bumper reinforcement is not limited to it, and can be formed arbitrarily. In short, so long as the cross-sectional shape can be formed by extrusion, the bumper reinforcement can be formed into any shape including, e.g., a modified cross-sectional shape as well as a round shape, an elliptical shape, an oval shape, a polygonal shape, and various cross-sectional shape formed by combing these shapes.

Figure 11:
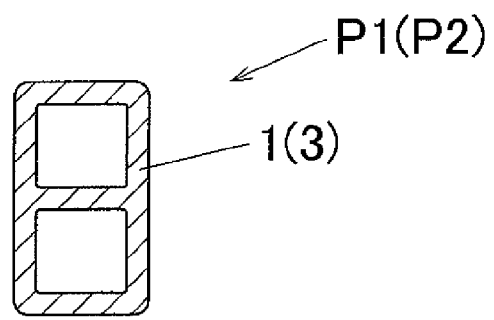
FIG. 11 is a side cross-sectional view showing the bumper reinforcement of the second modification of the present invention.

Furthermore, in the bumper reinforcement of the present invention, a reinforcing member or a rib can be formed inside thereof. For example, as shown in FIG. 11, the present invention can also be applied to a bumper reinforcement P1 having a cross-section of "日" in which a bridging portion is formed therein.

Furthermore, in the aforementioned embodiment, although the cross-sectional shape of the light-weighted portion and the cross-sectional shape of the non-light-weighted portion are formed to be approximately similar. The present invention, however, is not limited to it, and can be formed to have a light-weighted portion and a non-light-weighted portion different in cross-sectional shape. For example, one of the light-weighted portion and the non-light-weighted portion is formed into a round cross-sectional shape, while the other is formed into a rectangular cross-sectional shape.

In the aforementioned embodiment, the light-weighted portion is formed to be smaller in outer diameter and wall thickness than the non-light-weighted portion to thereby reduce the second moment of area and the wall thickness of the light-weighted portion. The present invention is not limited to it. For example, in the present invention, either the outer diameter or the wall thickness can be reduced, or the outer diameter and the wall thickness can be partially reduced, to thereby reduce the second moment of area and the cross-sectional area of the light-weighted portion.

In the die-less working method of the aforementioned embodiments, the work W is deformed by applying a tensile force thereto. The present invention is not limited to it. In the present invention, the work can be deformed by a compressing force. In other words, in the present invention, the reinforced portion or another portion can be increased in diameter and wall thickness to be deformed by applying a compressing force to the heated portion of the work.

Furthermore, the present invention allows employing a die-less working method that performs deformation for reducing a diameter and a wall thickness by a tensile force and deformation for increasing a diameter and a wall thickness by a compressing force.

Furthermore, in the aforementioned embodiments, die-less working is employed as plastic working to reduce the diameter and the wall thickness of the light-weighted portion to reduce the second moment of area and the cross-sectional shape. The present invention, however, is not limited to it. The present invention allows employing upsetting forming, bulge forming, hydroforming to increase the diameter and the wall thickness of the reinforced portion to thereby increase the second moment of area and the cross-sectional area.

Furthermore, the present invention allows combination of any two or more of upsetting forming, bulge forming, and hydroforming to cause deformation of the cross-sectional shape of predetermined portions of the work.

In the aforementioned embodiments, the bumper reinforcement is configured to be attached to a vehicle structure such as a side frame via a stay 53. In the present invention, however, the attaching means for attaching the bumper reinforcement to a vehicle body is not limited. For example, the present invention allows direct attachment of the bumper reinforcement to a vehicle structure such as a side frame.

Furthermore, in the aforementioned embodiments, the explanation was made by exemplifying the case in which the bumper reinforcement is applied to a front under lamp protector. The present invention, however, is not limited to it. The bumper reinforcement of the present invention can be applied to a bumper main body or a rear side bumper.

Furthermore, the present invention is not limited to be applied to a bumper reinforcement for a large-sized truck, and can be applied to a bumper reinforcement for another large-sized vehicles, medium-size ordinary vehicles, and down-sized vehicles.

Furthermore, in each of the aforementioned embodiments, the plurality of light-weighted portions are formed to have the same outer diameter, the same shape, the same wall thickness with each other. The present invention, however, is not limited to it. In the present invention, in the case of forming a plurality of light-weighted portions, the size, the shape, the wall thickness, etc., can be formed to be different from each other.

EXAMPLES

As shown in FIGS. 1 to 3, in the same manner as in the first embodiment, a bumper reinforcement P1 made of aluminum alloy as a front under lamp protector in which the intermediate portion 2 was finished as a light-weighted portions 21 and 22 was produced.

At this time, the cross-sectional area A1 of each of the reinforced portion 1 and both the side portions 2 was set to 282 mm$^2$, and the second moment of area I1 was set to 2077442.6 mm$^4$, the cross-sectional area A2 of the main light-weighted portion 21 was set to 1804.9 mm$^2$, and the second moment of area 12 was set to 850990.5 mm$^4$.

The area decrease ratio "1−(A2/A1)" and the pulling speed V1 of the die-less working device, and the coil traveling speed V2 satisfy the relation of "1−(A2/A1)=V1/(V1+V2)."

A static breaking test was performed by applying a load F1-F3 to the main light-weighted portion 21 and the side portion 3 of the bumper reinforcement P1 of this example. As a result, the maximum load F1 at the reinforced portion 1 was 107.8 kN (11 ton·f), the maximum load F2 at the main light-weighted portion 21 was 50.96 kN (5.2 ton·f), the maximum load F3 at the side portion 3 was 49 kN (5 ton·f), and a predetermined load bearing characteristic was obtained. Thus, the design target was achieved.

The product mass (weight) was measured to be 12.7 kg.

On the other hand, as shown in FIG. 12, a bumper reinforcement P51 which was the same as the aforementioned example expect that it had the same cross-sectional shape along the entire length was produced by extrusion. In this bumper reinforcement of this reference example 1, it was formed to have the same cross-sectional shape as the reinforced portion 1 of the bumper reinforcement P1 of the aforementioned example at any longitudinal portion.

The product mass of the bumper reinforcement P51 of this reference example 1 was measured to be 15.2 kg.

A bumper reinforcement made of steel was produced by welding so that the shape became the same as the reference example 1.

The product mass of the bumper reinforcement of this reference example 2 was measured to be 21.7 kg.

As will be apparent form the above results, we confirmed that the bumper reinforcement P1 of the example according to the present invention could secure sufficient load bearing characteristic and could trimmed the weight by 2.5 kg as compared with the bumper reinforcement P51 made of the same material of the reference example 1, and especially could trimmed the weight by 9.0 kg as compared with the bumper reinforcement made of steel of the reference example 2.

This application claims priority to Japanese Patent Application No. 2008-99961 filed on Apr. 8, 2008, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims an not limited to examples described in the present specification or during the prosecution of the application, which examples are to be construed as non-exclusive.

INDUSTRIAL APPLICABILITY

The bumper reinforcement for vehicles according to the present invention can be applied to a front under lamp protector for large-sized vehicles.

BRIEF DESCRIPTION OF THE REFERENCE NUMERALS

1 . . . reinforced portion
11 . . . fixing portion
2 . . . intermediate portion

21 . . . main light-weighted portion (light-weighted portion)
22 . . . shape transition portion (light-weighted portion)
3 . . . side portion
32 . . . shape transition portion (light-weighted portion)
P1, P2, P11 . . . bumper reinforcement
W . . . work

The invention claimed is:

1. A method of manufacturing a bumper reinforcement for vehicles, the method comprising:
deforming a hollow extruded product by plastic working to form the bumper reinforcement, wherein
the bumper reinforcement is an integrally molded product,
the bumper reinforcement includes a reinforced portion including a fixing portion, an inner end section adjacent to the fixing portion, and an outer end section adjacent to the fixing portion on an opposite side of the fixing portion from the inner end section, the fixing portion arranged to be fixed to a vehicle structural member at a part of the bumper reinforcement in a longitudinal direction,
an intermediate portion adjacent to the inner end section of the reinforced portion,
the intermediate portion has a lighter weight than the reinforced portion and is smaller in second moment of area and cross-sectional area than the reinforced portion,
a length of each of the inner end section and the outer end section is from 50 mm to 350 mm and 0.5 to 3.5 times a length of the fixing portion, and
the step of deforming the hollow extruded product includes applying a tensile force or a compressive force to the hollow extruded product in the longitudinal direction while heating the hollow extruded product, and then cooling the hollow extruded product to solidify and stabilize the deformed hollow extruded product.

2. The method of manufacturing a bumper reinforcement for vehicles as recited in claim 1, wherein the intermediate portion has an outer dimension smaller than an outer dimension of the reinforced portion.

3. The method of manufacturing a bumper reinforcement for vehicles as recited in claim 1, wherein the reinforced portion includes a reinforced portion on both sides of the intermediate portion.

4. The method of manufacturing a bumper reinforcement for vehicles as recited in claim 3,
wherein the intermediate portion includes shape transitional portions connected to the reinforced portions on both sides of the intermediate portion, and a main intermediate portion arranged between the shape transitional portions, and
the shape transitional portions have a cross-sectional shape that changes smoothly from the reinforced portion to the main intermediate portion.

5. The method of manufacturing a bumper reinforcement for vehicles as recited in claim 1, further comprising a side end portion adjacent to the outer end section of the reinforced portion in the longitudinal direction, the side end portion having a lighter weight than the reinforced portion.

6. The method of manufacturing a bumper reinforcement for vehicles as recited in claim 4, wherein the main intermediate portion has the same cross-sectional shape along an entire longitudinal direction thereof.

7. The method of manufacturing a bumper reinforcement for vehicles as recited in claim 4, wherein the reinforced portion has the same cross-sectional shape along an entire longitudinal direction thereof.

8. The method of manufacturing a bumper reinforcement for vehicles as recited in claim 4, wherein a peripheral wall thickness of the shape transitional portions gradually decreases from the reinforced portion to the main intermediate portion.

9. A bumper reinforcement for vehicles, the bumper reinforcement comprising:
a reinforced portion including a fixing portion, an inner end section adjacent to the fixing portion, and an outer end section adjacent to the fixing portion on an opposite side of the fixing portion from the inner end section, the fixing portion arranged to be fixed to a vehicle structural member at a part of the bumper reinforcement in a longitudinal direction thereof, and
an intermediate portion adjacent to the inner end section of the reinforced portion, wherein
the bumper reinforcement is a hollow extruded product,
the intermediate portion has a lighter weight than the reinforced portion and is smaller in second moment of area and cross-sectional area than the reinforced portion,
a length of each of the inner end section and the outer end section is from 50 mm to 350 mm and 0.5 to 3.5 times a length of the fixing portion;
a peripheral wall thickness of the intermediate portion is thinner than a peripheral wall thickness of the reinforced portion; and
the hollow extruded product has a rectangular cross-sectional shape.

10. A bumper reinforcement for vehicles, the bumper reinforcement comprising:
a reinforced portion including a fixing portion, an inner end section adjacent to the fixing portion, and an outer end section adjacent to the fixing portion on an opposite side of the fixing portion from the inner end section, the fixing portion arranged to be fixed to a vehicle structural member at a part of the bumper reinforcement in a longitudinal direction thereof, and
an intermediate portion adjacent to the inner end section of the reinforced portion, wherein
the bumper reinforcement is a hollow extruded product,
the intermediate portion has a lighter weight than the reinforced portion and is smaller in second moment of area and cross-sectional area than the reinforced portion,
a length of each of the inner end section and the outer end section is from 50 mm to 350 mm and 0.5 to 3.5 times a length of the fixing portion;
a peripheral wall thickness of the intermediate portion is thinner than a peripheral wall thickness of the reinforced portion; and
each of the reinforced portion and the intermediate portion has a rectangular cross-sectional shape.

* * * * *